United States Patent
Lin

(10) Patent No.: US 9,489,011 B2
(45) Date of Patent: Nov. 8, 2016

(54) REAL-TIME-CALIBRATION CIRCUIT FOR MULTIPLE CPUS

(71) Applicant: CHYNG HONG ELECTRONIC CO., LTD., Taichung (TW)

(72) Inventor: Mu-Chun Lin, Taichung (TW)

(73) Assignee: CHYNG HONG ELECTRONIC CO., LTD., Taichung (TW)

(*) Notice: Subject to any disclaimer, the term of this patent is extended or adjusted under 35 U.S.C. 154(b) by 0 days.

(21) Appl. No.: 14/790,772

(22) Filed: Jul. 2, 2015

(65) Prior Publication Data

US 2016/0224054 A1    Aug. 4, 2016

(30) Foreign Application Priority Data

Jan. 30, 2015   (TW) .............................. 104201514 A

(51) Int. Cl.
G06F 1/14   (2006.01)
G06F 1/12   (2006.01)
G06F 1/04   (2006.01)

(52) U.S. Cl.
CPC . G06F 1/14 (2013.01); G06F 1/04 (2013.01); G06F 1/12 (2013.01)

(58) Field of Classification Search
CPC ............... G06F 1/04; G06F 1/12; G06F 1/14
See application file for complete search history.

(56) References Cited

U.S. PATENT DOCUMENTS

| | | | |
|---|---|---|---|
| 2008/0168182 A1* | 7/2008 | Frank ........................ | G06F 1/12 709/248 |
| 2011/0085540 A1* | 4/2011 | Kuwabara ......... | H04W 56/0015 370/350 |
| 2012/0233487 A1* | 9/2012 | Okano ..................... | G06F 1/14 713/400 |

* cited by examiner

*Primary Examiner* — Dennis M Butler
(74) *Attorney, Agent, or Firm* — Ming Chow; Sinorica, LLC

(57) ABSTRACT

A real-time-calibration circuit for multiple CPUs includes the CPUs for communication, for control and for acting as a panel board. The CPUs each have a real-time clock built therein. The CPU for communication is connected with an external real-time clock, and only the external real-time clock is connected with a battery. Through the CPU for communication, a standard time is obtained from an external network and provided to the external real-time clock for time calibration. Then a calibration value generated from the time calibration is fed back to the CPU for communication to be used by the real-time clock of the CPU for communication and the real-time clocks of the other CPUs, so as to prevent the CPUs from interfering communication during time calibration, and reduce the need of power and of batteries, thereby saving energy and costs and being friendly to the environment.

3 Claims, 3 Drawing Sheets

REAL-TIME-CALIBRATION CIRCUIT FOR MULTIPLE CPUS

The current application claims a foreign priority to application number 104201514 filed on Jan. 30, 2015 in Taiwan.

BACKGROUND OF THE INVENTION

1. Technical Field

The present invention relates to time-calibration circuits and more particularly to a real-time-calibration circuit for multiple CPUs.

2. Description of Related Art

A real-time clock is known to being used in electronic devices such as personal computers, mobile phones, and servers, for getting the actual time. Generally, the conventional real-time clock is electrically connected with a CPU of the electronic device or built directly in the CPU. Where the electronic device has plural CPUs, theses CPUs usually each have a real-time clock for timing independently. Also, peripheral apparatuses for the electronic device usually each have a real-time clock for getting the actual time.

FIG. 1 shows a conventional circuit for controlling real-time clocks of multiple CPUs. In a conventional electronic device, the CPUs 1, 4, 7 function as a communication means, a control means and a panel board, respectively. Therein, CPU 1 is further connected with an external network 200. The CPUs 1, 4, 7 each have a real-time clock 2, 5 or 8 built therein. The real-time clocks 2, 5, 8 work for getting the actual time independently. However, differences are likely to exist among the results of the real-time clocks 2, 5, 8, and such differences can accumulate over time to the extent that the operation of the electronic device is adversely affected. For performing time calibration on the real-time clocks 2, 5, 8, the real-time clocks 2, 5, 8 have to be calibrated one after another, and this process may interference the communication among the CPUs 1, 4, 7. Moreover, for allowing the real-time clocks 2, 5, 8 to remain running with the correct time after the electronic device is turned off or unpowered, the real-time clocks 2, 5, 8 have to be connected with batteries 3, 6, 9. These batteries increase the manufacturing costs of the electronic device. In view of this, the inventor of the present invention makes improvement to the conventional real-time clocks by providing the present invention.

SUMMARY OF THE INVENTION

The primary objective of the present invention is to provide a real-time-calibration circuit for multiple CPUs, wherein a single external real-time clock is used to calibrate the CPUs in terms of time, so as to eliminate errors and reduce communication interference among the CPUs. Furthermore, such a configuration can reduce the number of batteries required, thereby saving costs.

For achieving the foregoing objective, the disclosed real-time-calibration circuit for multiple CPUs comprises: an external real-time clock, being connected with and alternatively powered by a battery; a first CPU acting for communication when connected with an external network for communication, wherein the first CPU is connected with the external real-time clock and includes a first real-time clock built therein; a second CPU acting for control, wherein the second CPU is connected with the first CPU and includes a second real-time clock built therein; and a third CPU acting as a panel board, wherein the third CPU is connected with the first CPU and includes a third real-time clock built therein.

In the disclosed real-time-calibration circuit for multiple CPUs, the first CPU obtains the standard time from the external network and provides it to the external real-time clock for time calibration. The external real-time clock then provides the standard time to the real-time clock of each of the CPUs. Thereby, with the external real-time clock that consistently performs time calibration on the CPUs, errors can be eliminated and communication interference among the CPUs can be prevented. This configuration can also reduce power consumption and the number of batteries required, so as to lower costs.

DETAILED DESCRIPTION OF THE INVENTION

Figure 1:
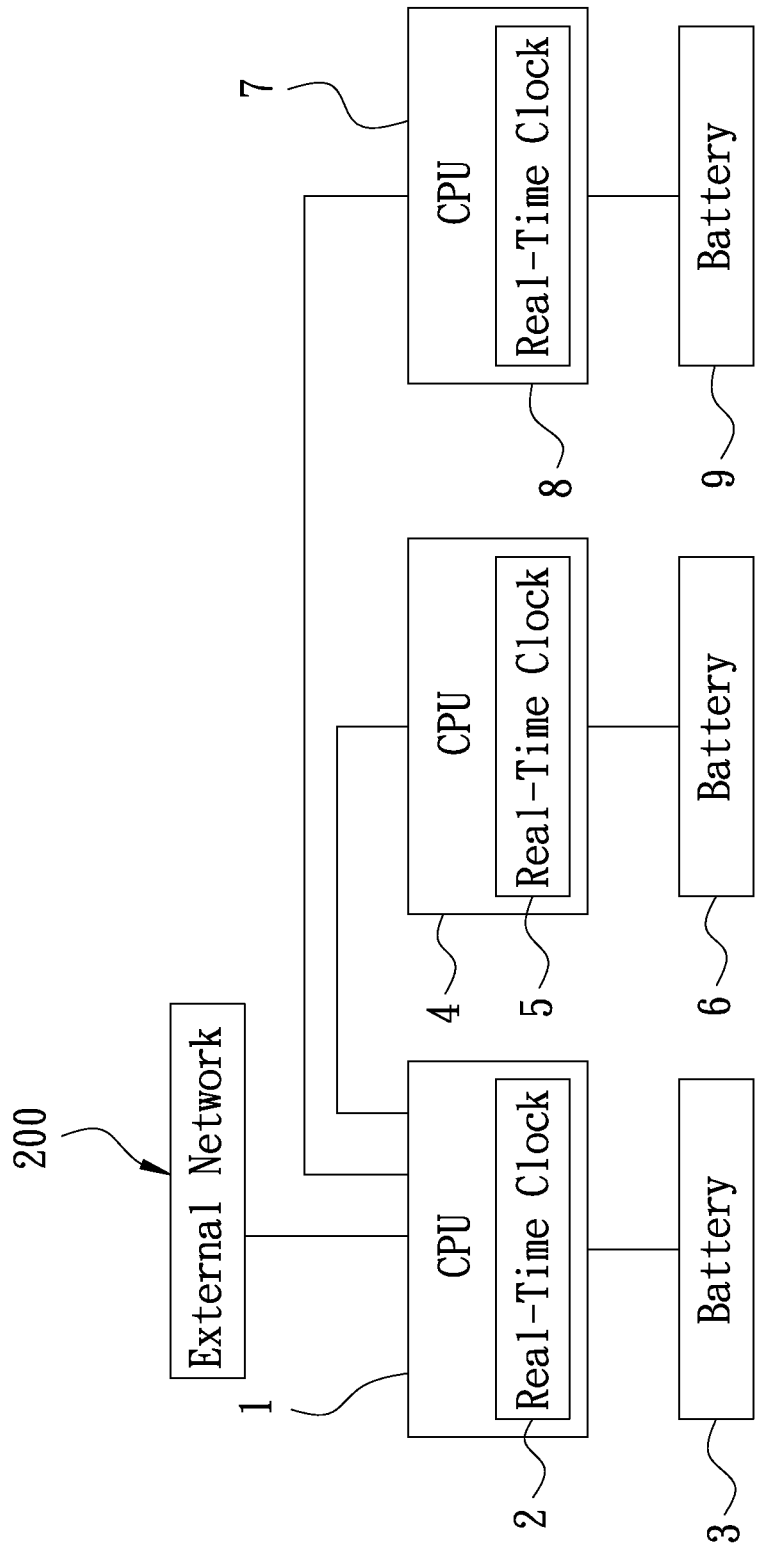
FIG. 1 is a block diagram of a conventional circuit for controlling real-time clocks of multiple CPUs.
Figure 2:
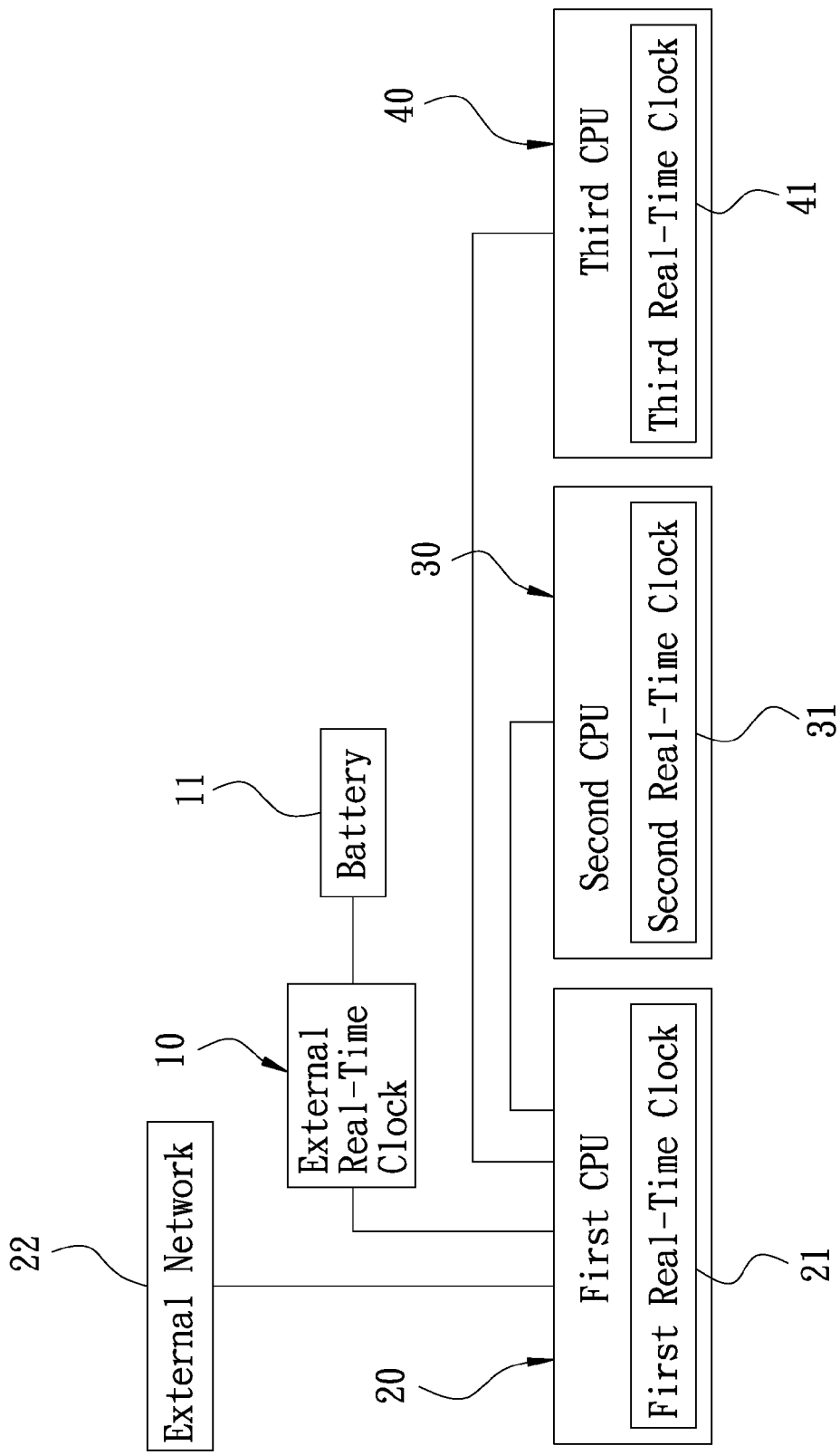
FIG. 2 is a block diagram of a circuit according to the present invention, wherein the circuit is connected with an external network.

FIG. 2 is a block diagram of a circuit according to the present invention, wherein the circuit is connected with an external network. As shown, the real-time-calibration circuit for multiple CPUs implements a real-time clock calibrating mechanism that uses an external real-time clock 10, a first CPU 20, a second CPU 30, and a third CPU 40.

The external real-time clock 10 is connected with and alternatively powered by a battery 11, so that when the external real-time clock 10 loses the external power signals, the battery 11 can take over and power the external real-time clock 10, thereby allowing the external real-time clock 10 to run ceaselessly. In the present embodiment, the battery 11 is a lithium-ion battery.

The first CPU 20 acts as a communication means and is configured to be connected with an external network 22, so as to communicate with the exterior. The first CPU 20 includes a first real-time clock 21 built therein. The first CPU 20 and the external real-time clock 10 are connected with each other.

The second CPU 30 acts as a control means. The second CPU 30 and the first CPU 20 are connected with each other. The second CPU 30 includes a second real-time clock 31 built therein.

The third CPU 40 acts as a panel board. The third CPU 40 and the first CPU 20 are connected with each other. The third CPU 40 includes a third real-time clock 41 built therein.

Referring to FIG. 2, when the real-time-calibration circuit is turned on and is connected to the network, the first CPU 20 obtains the standard time from the external network 22 first, and sends the standard time to the external real-time clock 10 for calibration. After receiving the standard time, the external real-time clock 10 sends the standard time back to the first CPU 20, so that the first real-time clock 21 of the first CPU 20 is calibrated in terms of time. Then the first CPU 20 sends the calibration value to the second CPU 30 and the third CPU 40, so that the second real-time clock 31 of the second CPU 30 and the third real-time clock 41 of the third CPU 40 are also calibrated in terms of time. By using the first CPU 20 to obtain the standard time from the external network 22 and send the calibration value to the external real-time clock 10 for time calibration, and then making the external real-time clock 10 provide the standard time to the first CPU 20 that in turn sends the calibration value to the second CPU 30 and the third CPU 40, the disclosed circuit has the real-time clocks 21, 31, 41 of the CPUs 20, 30, 40 being aligned with the same standard time, so as to eliminate differences among the real-time clocks 21, 31, 41 of the CPUs 20, 30, 40.

Figure 3:
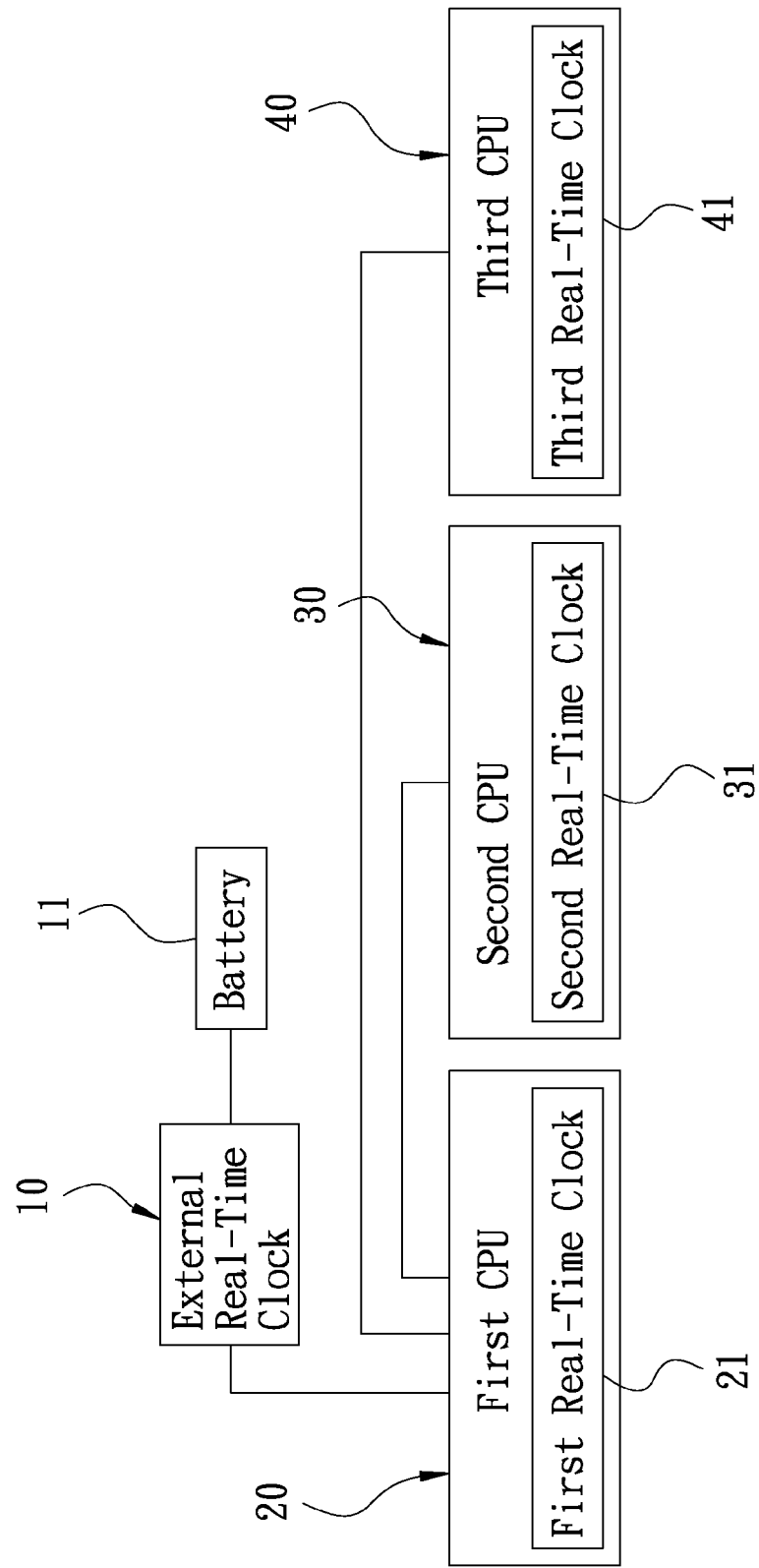
FIG. 3 is a block diagram of the circuit according to the present invention, wherein the circuit is not connected with an external network.

Referring to FIG. 3, when the real-time-calibration circuit is turned on but not connected to the network, the external real-time clock 10 directly provides the calibration value to the first CPU 20, so that the first CPU 20 gets its own first real-time clock 21 calibrated. Then the first CPU 20 sends the calibration value to the second CPU 30 and the third CPU 40, so that the second CPU 30 and the third CPU 40 have their second real-time clock 31 and third real-time clock 41 calibrated in terms of time. With the process that the external real-time clock 10 provides the standard time to the first CPU 20, and then the first CPU 20 sends the calibration value to the second CPU 30 and the third CPU 40, it is ensured that the real-time clocks 21, 31, 41 built in the CPUs 20, 30, 40 share the same standard time.

When the circuit is turned off, the external real-time clock 10 is powered by the battery 11 and keeps running to get the actual time. On the other hand, the real-time clocks 21, 31, 41 built in the CPUs 20, 30, 40 stop when the circuit is turned off, and when the circuit is on, get calibrated according to the standard time obtained by the external real-time clock 10. Thereby, power consumption can be significantly reduced, so as to save energy. Besides, since the present invention needs a single battery 11 to supply sufficient power, the manufacturing costs can be further lowered, so the present invention is economically beneficial.

It is to be noted that the external real-time clock 10 may perform calibration whenever the circuit is on, and perform calibration periodically with a certain interval, so that the real-time clocks 21, 31, 41 built in the CPUs 20, 30, 40 can run with the same standard time and need not to be calibrated frequently, thereby minimizing communication interference among the CPUs 20, 30, 40.

What is claimed is:

1. A real-time-calibration circuit for multiple CPUs, the real-time-calibration circuit comprising:
    an external real-time clock, being connected with and alternatively powered by a battery;
    a first CPU acting for communication when connected with an external network for communication, wherein the first CPU is connected with the external real-time clock and includes a first real-time clock built therein;
    a second CPU acting for control, wherein the second CPU is connected with the first CPU and includes a second real-time clock built therein; and
    a third CPU acting as a panel board, wherein the third CPU is connected with the first CPU and includes a third real-time clock built therein;
    whereby, after the first CPU obtains a standard time from the external network and sends the standard time to the external real-time clock for time calibration, the external real-time clock sends a calibration value back to the first CPU so that the first CPU performs time calibration on the first real-time clock built therein, and sends the calibration value to the second real-time clock and the third real-time clock for time calibration.

2. The real-time-calibration circuit of claim 1, wherein the external real-time clock performs calibration based on the standard time obtained by the first CPU from the external network whenever the real-time-calibration circuit is turned on.

3. The real-time-calibration circuit of claim 1, wherein the battery is a lithium-ion battery.

\* \* \* \* \*